Jan. 16, 1940.    G. MALEK    2,187,356
MOVING PICTURE CAMERA
Original Filed June 2, 1937
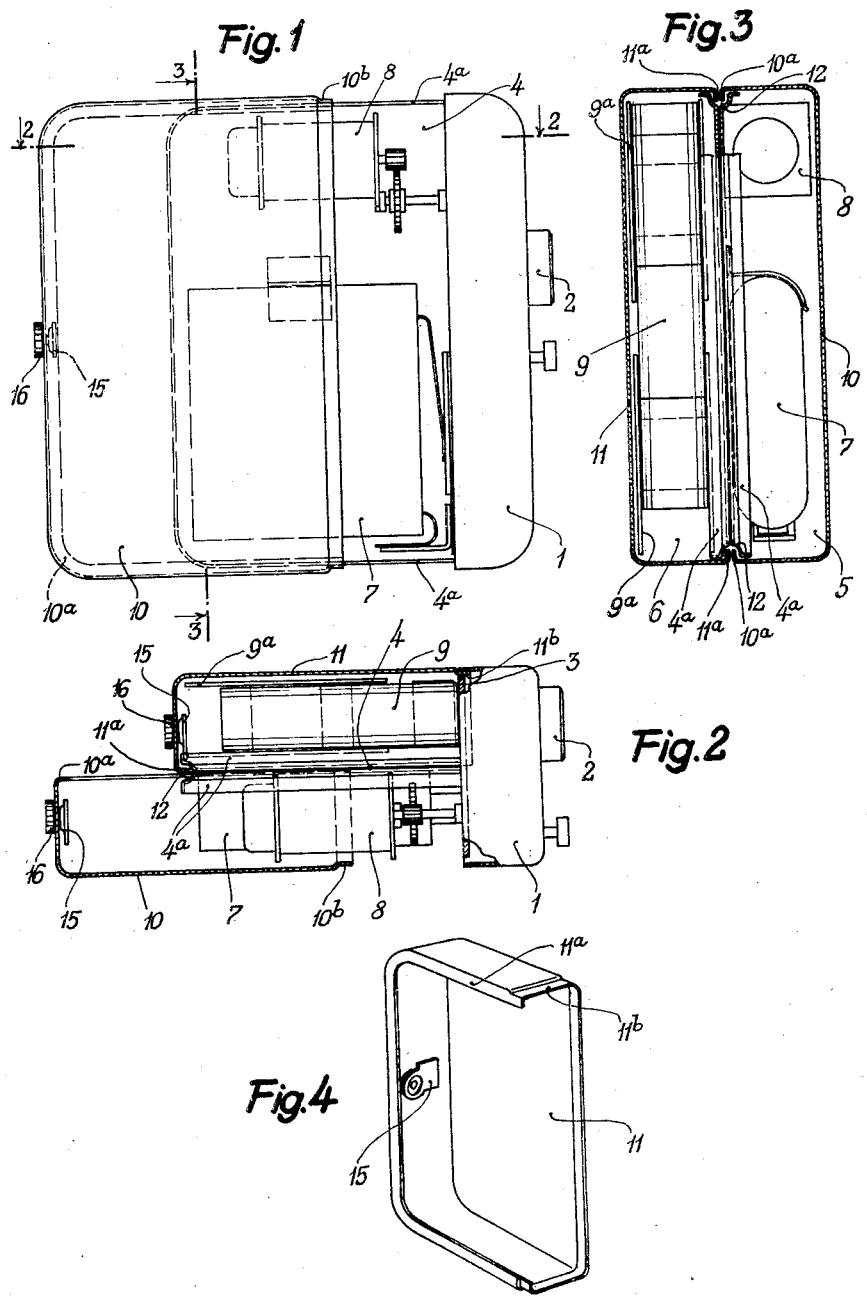
INVENTOR:
GEORG MALEK
BY Haseltine, Lake & Co.
ATTORNEYS Patented Jan. 16, 1940

2,187,356

UNITED STATES PATENT OFFICE 2,187,356

MOVING PICTURE CAMERA

Georg Malek, Vienna, Germany, assignor to firm of "Eumig" Elektrizitats- und Metallwaren-Industrie, Vienna, Austria, a firm of Austria Original application June 2, 1937, Serial No. 146,089. Divided and this application May 4, 1938, Serial No. 205,875. In Austria June 5, 1936

1 Claim. (Cl. 88—17)

This invention relates to moving picture cameras and is a division of my copending application, Serial No. 146,089, filed June 2, 1937. It relates preferably to moving picture cameras of the type in which the rear portion of the interior space in the casing is divided by a longitudinal partition into two compartments of which the one contains preferably the source of power for the driving of the camera, e. g., an electromotor fed with current from a dry battery, while the other compartment preferably contains the film and/or the film reels. The front portion of the interior space, which is as a rule partitioned off from the two above-mentioned compartments by a transverse partition, preferably serves for the reception of the actual film advancing members and of the shutter (cut-out).

The invention consists in closing off the two compartments provided in the rear portion of the camera, in a light-tight manner, by means of shell-shaped or cupped sliding covers adapted to be slid from behind into engagement in guides on the longitudinal partition wall. These sliding covers are so constructed that they form the said compartment in coaction with the front standing portion of the casing, and with the subdividing transverse partition and the longitudinal partition, respectively, without the aid of any further casing wall portions, so that after withdrawal of the sliding covers the parts contained in the two compartments are completely exposed to view and accessible from outside. The free accessibility of the individual parts of the camera thus provided is of great service in the use and repairing of the camera.

Further features of the invention relate to the particular construction of the guides provided on the longitudinal partition for the sliding covers, and to locking means for securing the sliding covers in their position of closure.

A form of construction embodying the invention is shown, by way of example, in the accompanying drawing, in which:

Fig. 1 is a side elevation of the camera according to the invention, with a sliding cover partly withdrawn.

Fig. 2 is a plan view of the camera with the sliding covers cut through along the line 2—2 in Fig. 1, for the sake of clearness.

Fig. 3 is a rear elevation of the camera, the two sliding covers being again shown in section, the section being in this case taken on the line 3—3 in Fig. 1.

Fig. 4 shows one of the sliding covers in perspective view.

In the drawing 1 denotes the front standing portion of the casing in which the lens 2 of the camera is mounted, and between which and a transverse partition 3 there are preferably housed the driving elements proper for the feeding forward of the film and also the exposure shutter and the cut-out shutter of the camera. The rear portion of the camera is divided up by a longitudinal partition 4 into two compartments 5 and 6 of which the one preferably serves for the reception of the source of power for driving the camera, e. g., an electromotor 8 fed with current from a dry battery 7, while the other compartment preferably contains the film 9 and/or the film reels $9^a$. The two compartments 5 and 6 are closed off from the outside, in accordance with the invention, in a light-tight manner, by means of sliding covers 10 and 11. As shown in Fig. 4, these covers are shell-shaped or cupped, and slidable into engagement with guides provided on the longitudinal partition wall. According to a further feature of the invention these guides are formed of grooves 12 provided at the edge of the longitudinal partition 4, in which there engage in a light-tight manner ledges $10^a$ and $11^a$ provided, respectively, on the inner edges of the two sliding covers. For this purpose the guide groove 12 is formed in a simple manner by making the longitudinal partition in two parts, each edge of these two parts being so shaped as to form one half of the guide groove 12. If the longitudinal partition is made in one piece the guide groove 12 may of course also be formed by a U-shaped element of channeled section attached to the edge of this partition.

The light-tight closure of the compartments 5 and 6 is achieved on the one hand by the provision, as already mentioned, of the guide ledges $10^a$ and $11^a$ on the inner edges of the sliding covers, extending beyond the rear portion of the same, and by the engagement of these ledges in the groove 12 which likewise extends over the entire length of the edge of the longitudinal partition. On the other hand the joint between the sliding covers and the front standing portion 1 of the casing is rendered light-tight by the fact that the somewhat inwardly bent edges $10^b$ and $11^b$ engage beneath the edge of the portion 1 of the casing (see Fig. 2).

In order to secure the sliding covers in their position of closure there is provided, in accordance with the invention, a locking device disposed between the sliding covers and the longitudinal partition wall 4. This locking device may be designed in any desired manner, e. g., as shown in Figs. 2 and 4, in the form of a bolt 15 pivotally mounted on the sliding covers. These bolts or fasteners are operable from the outside by means of knobs 16 and in their position of closure engage beneath narrow supporting ledges 4ª provided on the longitudinal partition on either side of the guide groove 12, whereby the sliding covers are held fast in their closed position.

The invention is to be understood as being by no means restricted to the constructional example herein described and shown in the accompanying drawing. The actual design of the sliding covers and of the keeping and guiding elements associated therewith will naturally be modified to suit the shape and design of the camera in any particular instance. It is likewise possible, within the framework of this invention, to seal only one of the two longitudinal compartments with a sliding cover according to the invention.

I claim:

A moving picture camera having a casing which comprises a front part including the optical elements of the camera, a longitudinal partition connected to the rear portion of said front part intermediate the sides thereof, the driving elements of the camera being mounted upon said partition, two detachable side parts in the form of covers slidably arranged on the edges of the partition so as to form on both sides of said partition compartments which contain said driving elements, and guiding means for the covers comprising grooved portions on the edges of the partition and corresponding guide ledges upon the slide covers which engage the grooved portions on the partition in light-tight manner.

GEORG MALEK.